US012754066B2

(12) United States Patent
Naggies et al.

(10) Patent No.: US 12,754,066 B2
(45) Date of Patent: Oct. 6, 2026

(54) PHOTOMETRIC PROCESS MEASUREMENT ARRANGEMENT AND A METHOD FOR PERFORMING A PHOTOMETRIC MEASUREMENT

(71) Applicant: HACH LANGE GMBH, Berlin (DE)

(72) Inventors: Andre Naggies, Berlin (DE); Axel Leyer, Berlin (DE); Robert Dalljo, Berlin (DE)

(73) Assignee: HACH LANGE GMBH, Berlin (DE)

( * ) Notice: Subject to any disclaimer, the term of this patent is extended or adjusted under 35 U.S.C. 154(b) by 71 days.

(21) Appl. No.: 18/864,681

(22) PCT Filed: May 10, 2023

(86) PCT No.: PCT/EP2023/062371
§ 371 (c)(1),
(2) Date: Nov. 11, 2024

(87) PCT Pub. No.: WO2023/217834
PCT Pub. Date: Nov. 16, 2023

(65) Prior Publication Data
US 2025/0314526 A1 Oct. 9, 2025

(30) Foreign Application Priority Data
May 12, 2022 (EP) .................................... 22173052

(51) Int. Cl.
*G01J 1/02* (2006.01)
*G01J 1/44* (2006.01)

(52) U.S. Cl.
CPC ............... *G01J 1/0228* (2013.01); *G01J 1/44* (2013.01)

(58) Field of Classification Search
CPC ........... G01J 1/0228; G01J 1/44; G01J 3/2803
See application file for complete search history.

(56) References Cited

U.S. PATENT DOCUMENTS

2025/0208051 A1* 6/2025 Naggies .................... G01J 3/10

FOREIGN PATENT DOCUMENTS

EP 0953831 A2 11/1999
EP 2320213 A2 5/2011

OTHER PUBLICATIONS

European Patent Office, International Search Report and Written Opinion, Aug. 28, 2023, 10 pages.

* cited by examiner

*Primary Examiner* — Kevin K Pyo
(74) *Attorney, Agent, or Firm* — Ference & Associates LLC

(57) ABSTRACT

The invention refers to a photometric process measurement arrangement (10) with a photometric immersion probe (20). The photometric immersion probe (20) comprises a photometer flashlight source (61) for providing photometric light impulses, a photometric detector arrangement (70) comprising at least two separate wavelength-selective detection elements (71, 72, 73), and a photometer control (80) controlling the photometer flashlight source (61) and the detector arrangement (70). The photometer control (80) comprises several impulse signal integrators (819, 829, 839) for integrating the electric impulses generated by the detection elements (71, 72, 73), several A/D-converters (81, 82, 83) for converting the voltages of the impulse signal integrators (819, 829, 839) when high-precision-converting trigger ports (H) of the A/D-converters (81, 82, 83) are triggered, and a measuring cycle control (90) with an integration target memory (94) memorizing an integration target voltage value (Ut). The photometer control (80) is provided with a high-precision-request port (93) for synchronously triggering the high-precision-converting trigger ports (H) of all A/D-converters (81, 82, 83) after the voltage of the first of (Continued)

Figure 1:
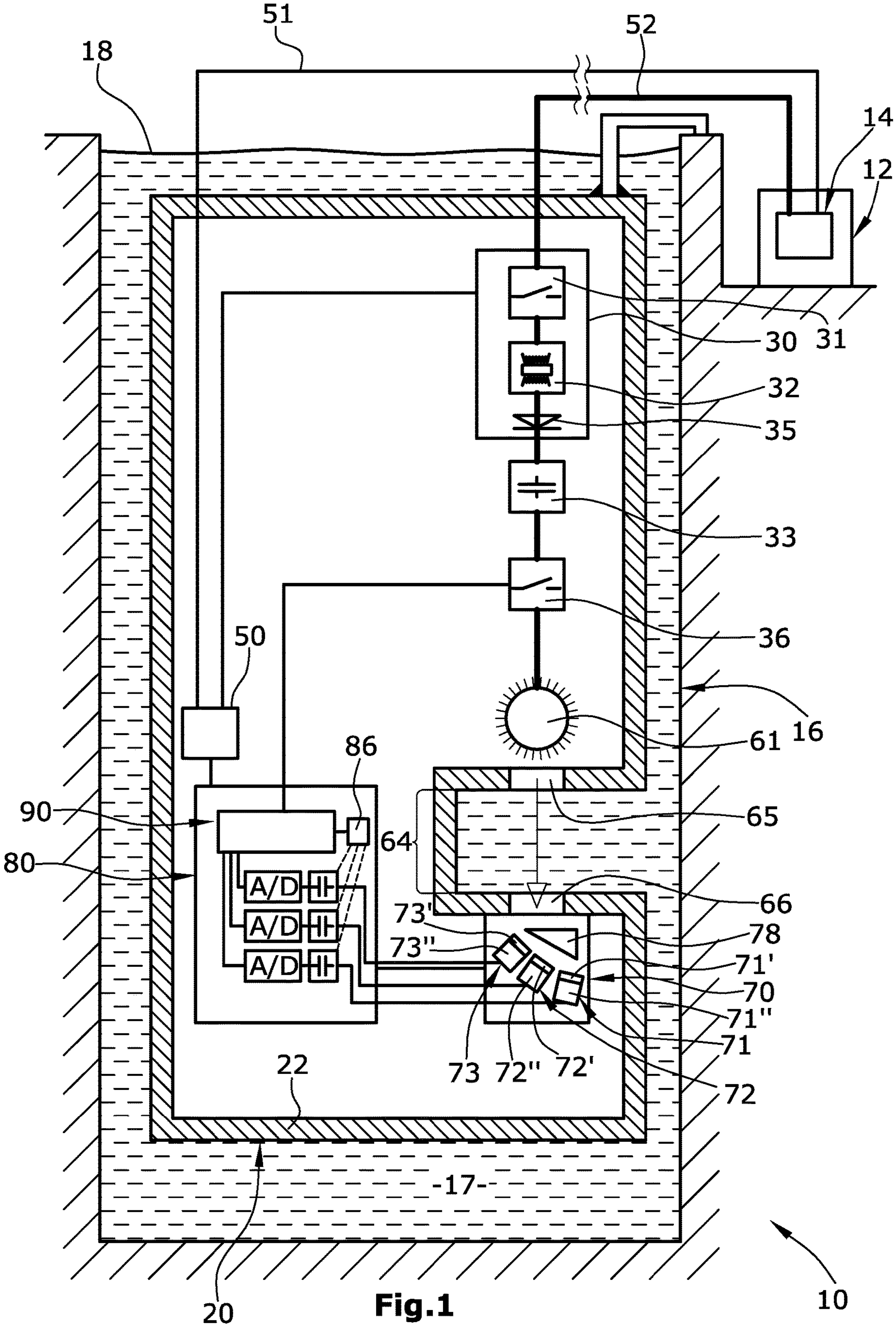

all impulse signal integrators (819, 829, 839) has exceeded the memorized integration target voltage value (Ut).

9 Claims, 4 Drawing Sheets

PHOTOMETRIC PROCESS MEASUREMENT ARRANGEMENT AND A METHOD FOR PERFORMING A PHOTOMETRIC MEASUREMENT

The present application is a National Phase Entry of PCT International Application No. PCT/EP2023/062371, which was filed on May 10, 2023, the contents of which are hereby incorporated by reference, which claims priority to EP Application Serial No. 22173052.6 filed May 12, 2022, the contents of which are hereby incorporated by reference.

The invention refers to a photometric process measurement arrangement with a photometric immersion probe and to a photometric measurement method provided by the photometric process measurement arrangement.

A photometric process measurement arrangement comprises a photometric immersion probe being immersed into the water of a water basin. The water basin can be a part of a water treatment plant for continuously controlling drinking water or for controlling a process step of a wastewater treatment process. A typical photometric immersion probe is disclosed in DE 10 2005 007 142 A1. A state-of-the art immersion probe comprises a photometer flashlight source for providing photometric light impulses with a sufficiently continuous or a quasi-continuous spectrum and comprises a photometric detector arrangement with a beam splitter and with at least two separate wavelength-selective detection elements.

In a state-of-the-art photometric control, the wavelength-selective detection elements are provided with impulse signal integrators for integrating the electric impulses generated by the detection elements. The impulse signal integrators are capacitors having a saturation voltage which must not be exceeded during the integration process within a measurement cycle so that the number of integratable flashlight source flashes within one measurement cycle is limited. Since the general application environment of the photometric process measurement arrangement can be very clear drinking water as well as highly turbid wastewater, the maximum acceptable number of flashlight source flashes within one measurement cycle can range between a very few flashes for very clear drinking water to more than a hundred flashes for very turbid waste water. Therefore, the number of flashes for avoiding a saturation voltage of the capacitor within a measurement cycle needs to be predefined dependent on the expected possible water turbidity range of the application. However, in case of an unexpected relatively clear water sample, the saturation voltage of the impulse ignition integrator can be reached and exceeded unintentionally so that the corresponding result of the measurement cycle cannot be used. This can be avoided by predefining the maximum number of flashes of a measurement cycle relatively low, implying that the accuracy potential of the photometer control is not utilized.

It is an object of the invention to provide a photometric process measurement apparatus and method for providing a photometric measurement with an improved systematic accuracy.

This object is achieved with a photometric process measurement arrangement with an adaptive impulse signal integration with a photometric measurement method.

The photometric process measurement arrangement according to the invention is provided with a photometric immersion probe which is preferably continuously and completely immersed into water of a water basin. The immersion probe comprises a photometer flashlight source for providing photometric light impulses with a suitable and sufficiently continuous optical spectrum, preferably with an optical spectrum focused on the ultraviolet range for the determination of the concentration of, for example, nitrate and nitrite. Preferably, the flashlight source is a high voltage gas-discharge lamp, more preferably a xenon flashlight lamp.

The photometric detector arrangement comprises at least two separate wavelength-selective detection elements, which can be a combination of a beam splitter, wavelength-selective filters and photocells, or comprises a suitable arrangement allowing to wavelength-selectively detect the intensities of at least two discrete wavelengths of the light impulses being generated by the flashlight source after being transmitted through the water sample. The photocells can be silicon photocells, and the wavelength-selective filters can be interference bandpass filters.

A photometer control controls the photometer flashlight source by triggering every flashlight source impulse. The photometric control comprises an impulse signal integrator for every detection element for integrating the electric impulses generated by the corresponding detection element. The impulse signal integrator preferably is an electric capacitor. The photometric control comprises A/D-converters for converting of the voltages of the impulse signal integrators. Every impulse signal integrator is provided with a corresponding A/D-converter. Every A/D-converter is provided with a high-precision-conversion trigger port. If the high-precision-conversion trigger port is electronically triggered, a high-precision A/D-conversion is initiated. An A/D-conversion with a high-precision can take, for example, up to 100 milliseconds so that a high-precision A/D-conversion preferably is only acceptable for the final determination of the voltage of the impulse signal integrator at the end of a measurement cycle.

The photometer control is provided with a measuring cycle control with an integration target memory memorizing an integration target voltage value. The photometric control is also provided with a high-precision-request port and synchronously triggers the high-precision-conversion trigger ports of all A/D converters after the voltage of the first of all impulse signal integrators has exceeded the memorized integration target voltage value.

As soon as the voltage of one of all impulse signal integrators has reached the integration target voltage value, the photometer flashlight source is stopped, and all A/D-converters are triggered to read and digitalize the voltage of the corresponding impulse signal integrators with the maximum available digital resolution and precision.

If the water sample is relatively clear, the number of photometric light impulses which are generated within a measurement cycle is relatively low. If the water sample is relatively turbid, the number of photometric light impulses within a measurement cycle is relatively high. The total number of photometric light impulses generated by the photometer flashlight source within one measurement cycle is adapted to the turbidity of the sample water.

This does not necessarily mean that this adaption is realized for every single measurement cycle. The adaption can be provided flexibly or in fixed intervals, for example at every 20th measurement cycle or once every minute. The other measurement cycles, which are the slave measurement cycles, are not individually adapted but are identical with the adaption measurement cycle, which is the master measurement cycle. This concept allows to spend more time for precisely analyzing the master measurement cycle than for the following slave measurement cycles, without substantially deteriorating the overall measurement cycle frequency.

The flexible adaption of the length of the measurement cycles allows to utilize the electric capacity of the impulse signal integrators and of the A/D converters to the most possible extend so that the general accuracy of the quantitative determination of a substance in the sample water is substantially increased.

There are generally different technical ways to monitor the development of the voltage of the impulse signal integrators during a measurement cycle. Preferably, the monitoring is not realized by providing a high precision A/D conversion after every single flashlight impulse because a high-precision A/D conversion is relatively time-consuming and takes much more time than an interval between the possible interval between two photometric light impulses. Preferably, the high precision A/D conversion is not provided more than five times within one single measurement cycle. More preferably, the high-precision A/D conversion is not used at all for the monitoring of the development of the voltage of the impulse signal integrators, but is only used for the final determination of the voltages of all A/D-converters at the end of a measurement cycle.

Preferably, the photometric control is provided with an integrator reset switch for synchronously resetting all impulse signal integrators before a new measurement cycle starts. The integrator reset switch is triggered after all A/D-converters have converted the final voltages of the impulse signal integrators with a high-precision-conversion. The integrator reset switch synchronously pulls the voltages of all impulse signal integrators down to zero so that a new measurement cycle can be started.

Preferably, the integration target voltage value is at least 20% below the saturation voltage of the impulse signal integrators but is at least 50% of the saturation voltage. The integration target voltage value must be substantially below the saturation voltage of the impulse signal integrator for the case of a very clear water sample causing a relatively high optical and electrical impulse received by the impulse signal integrator. The offset between the saturation voltage and the integration target voltage value must be higher than the highest possible impulse signal voltage of a single light impulse received by any of the detection elements.

Preferably, the photometric control is provided with a flash counter counting the number of flashes during a measurement cycle, and is provided with a maximum flash number memory memorizing a general maximum flash number value of flashes within one single measurement cycle. The photometric control triggers the high-precision-converting trigger ports of all A/D-converters when the number of flashes counted by the flash counter equals or exceeds the memorized maximum flash number. Defining a general maximum number of integrated flashes within one measurement cycle is a fallback measure for the case that the sample water is unexpectedly turbid or if other factors unexpectedly massively weaken the light finally received by the wavelength-selective detection elements. In that case, a measurement cycle is terminated before the voltage use of any of the impulse signal integrators has exceeded the memorized integration target voltage value. A warning signal can be generated in that case to cause a control and maintenance action.

Preferably, the A/D-converters are provided with a low-precision-conversion trigger port. All low-precision-conversion trigger ports of all A/D converters can synchronously be triggered by a corresponding low-precision request port of the photometric control, preferably, if the voltages of all impulse signal integrators are below the memorized integration target value. A low-precision conversion of an A/D-converter typically takes a few milliseconds, only, so that the low-precision conversion capability of the A/D-converter can be used in the beginning and/or in the course of a measurement cycle to provide a forecast of the total number of photometric light impulses within a measurement cycle until the voltage of a first of all impulse signal integrators will exceed the memorized integration target voltage value. This forecast allows to perfectly schedule and plan the moment of the relatively time-consuming high precision A/D conversion at the end of a measurement cycle.

The technical minimum interval between two subsequent photometric light impulses generated by the photometer flashlight source is typically in the range of 10 to 30 ms, so that the low-precision conversion interval of a typical A/D converter is shorter than the flashing interval, and therefore does not substantially affect the photometer impulse frequency.

The method claim according to the invention is directed to a photometric measurement method provided by a photometric process measurement arrangement comprising the features of one of the apparatus claims, and comprises the following measurement cycle method steps controlled by the photometer control:

- generating several light impulses with the photometer flashlight source,
- monitoring the voltages of all impulse signal integrators of the wavelength-selective detection elements,
- when the voltage of a first of all impulse signal integrators has exceeded the memorized integration target voltage value: synchronously triggering the high-precision-converting trigger ports of all A/D converters to determine the final voltages of all impulse signal integrators,
- resetting all impulse signal integrators, and
- starting a new measurement cycle.

The monitoring of the voltages of the impulse signal integrators can generally be provided in different ways by different means. However, the monitoring preferably is not provided by continuously using the high precision conversion function of the A/D-converters because the high precision conversion of the A/D-converters is very time-consuming and would substantially lengthen every measurement cycle.

Preferably, the monitoring step is provided by the photometer control by triggering the low-precision-conversion trigger ports of all A/D-converters. Since a low-precision-conversion takes only a few milliseconds, the monitoring action using the low-precision-conversion function of all of the A/D converters does not substantially affect the length of a measurement cycle.

Preferably, the photometric control estimates the total number of flashes of the full measurement cycle before the fourth flash of the measurement cycle. In other words, the first estimation of the total number of flashes and impulses of a full measurement cycle is provided very early so that—even with very clear sample water—it can be reliably avoided that one of the impulse signal integrators is unintentionally charged up to the signal integrator's situation voltage.

Preferably, the photometric control triggers the high-precision-converting trigger ports of all A/D converters and starts a new measurement cycle when the number of flashes within a measurement cycle is equal to the maximum memorized maximum flash number. Defining a maximum number of integrated flashes within one measurement cycle avoids a too long measurement cycle for the case that the sample water is unexpectedly turbid or if other factors weaken the light received by the wavelength-selective detection elements. In that case, a warning signal can be generated to cause a control and maintenance action.

Figure 2:
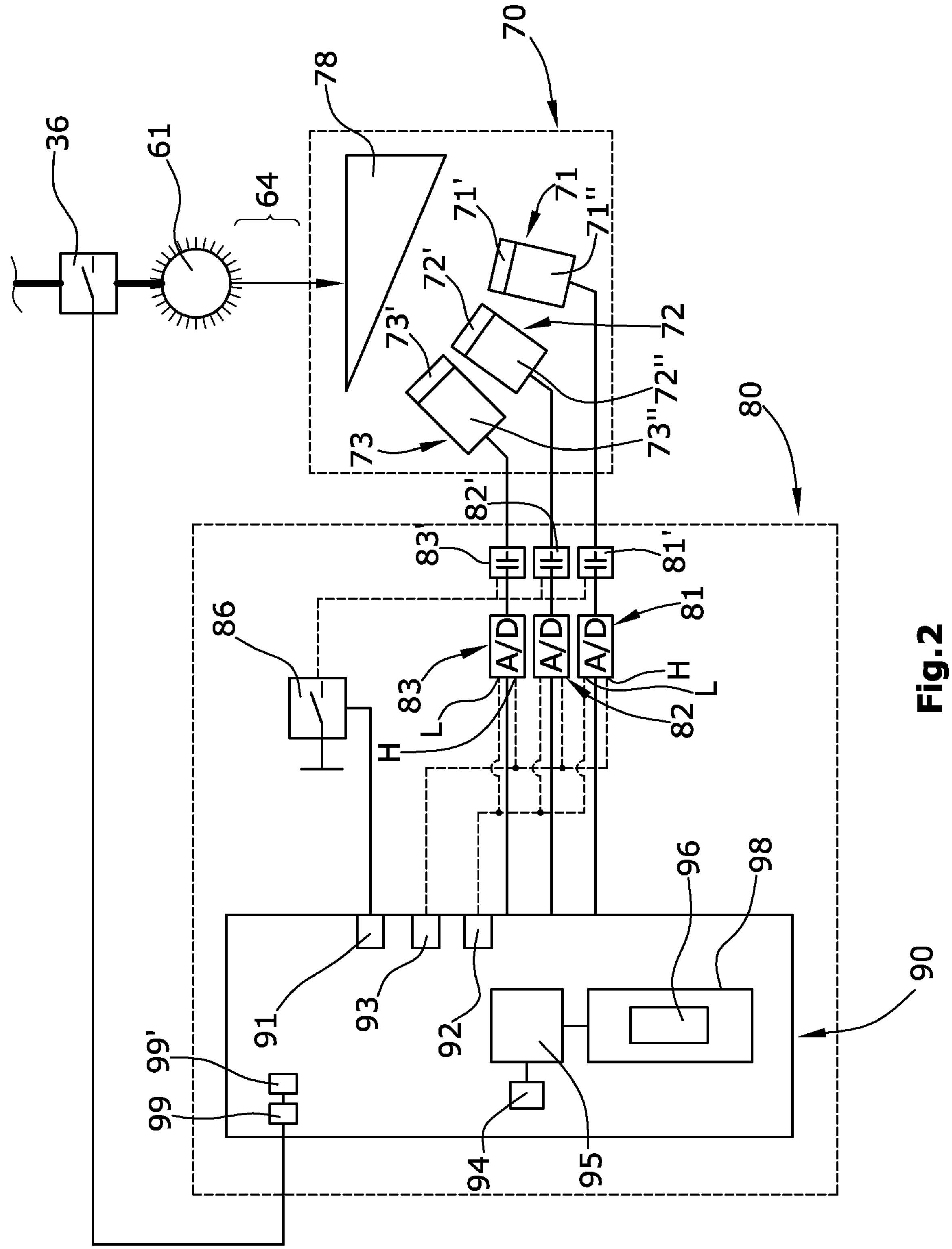

One embodiment of the invention is described with reference to the enclosed drawings, wherein FIG. 1 schematically shows a photometric process measurement arrangement with a photometric immersion probe comprising a photometric detector arrangement and a photometer control, FIG. 2 schematically shows the photometric detector arrangement and the photometer control of FIG. 1 in more detail, and FIGS. 3*a* to 3*d* show diagrams of the voltage versus time of the impulse signal integrator with the highest received light impulse intensity of the photometer control of FIGS. 1 and 2 for different sample water absorptions and turbidities.

FIG. 1 schematically shows a photometric process measurement arrangement 10 substantially consisting of a land-based control unit 12 and a photometric immersion probe 20 being arranged remote from the land-based control unit 12. The immersion probe 20 is arranged below a water surface 18 and is completely immersed into water 17 of a water basin 16. The water basin 16 can be a part of a wastewater treatment plant. Alternatively, the immersion probe 20 can be used in a laboratory application.

The measurement arrangement 10 is generally suitable for quasi-continuously photometrically determine the concentration of at least one water parameter. In the present embodiment, the photometric process measurement arrangement 10 determines the concentration of nitrite and nitrate in the sample water 17 with a measurement frequency of a few seconds.

The photometric immersion probe 20 comprises, within a fluidtight probe housing 22, an electronic flyback-converter 30 for energizing an impulse energy capacitor 33, comprises an impulse ignition switch 36 and a photometer flashlight source 61 being a xenon flash lamp for providing photometric light impulses with a sufficiently quasi-continuous spectrum in the ultraviolet range. The flyback-converter 30 is supplied by the land-based control unit 12 with electric energy via an electric supply line 52, and comprises a converter switch 31, a transformer 32 and a blocking diode 35. The charging duration for charging a completely empty impulse energy capacitor 33 is about 10 ms until the impulse energy capacitor's voltage reaches a defined ignition voltage value.

The photometric immersion probe 20 comprises a photometric detector arrangement 70 with an optical beam splitter 78 and three separate wavelength-selective detection elements 71, 72, 73. Every wavelength-selective detection element 71, 72, 73 comprises an interference bandpass filter 71',72',73' and a corresponding photocell 71",72",73". The detection elements 71, 72, 73 detect the light impulses generated by the flashlight source 61 at wavelengths of 218 nm, 225 nm and 245 nm. The 218 nm and the 225 nm detection elements 71, 72 are used for the direct detection of the extinction/absorption caused by the nitrite and the nitrate concentration in the probe water. The 245 nm detection element 73 is a reference detector for supervising the general constitution and performance of the flashlight source 61 and of the optical path between the flashlight source 61 and the detection elements 71,72,73. The photometer flashlight source 60 one and the photometric detector arrangement 70 define a photometer device for detecting the light absorption of sample water in a photometric measuring section 64 defined between a measuring section light inlet window 65 and a measuring section light outlet window 66.

The photometric immersion probe 20 comprises a photometer control 80 with three impulse signal integrators 81',82',83', three corresponding A/D-converters 81,82,83, an integrator reset switch 86 and a measuring cycle control 90. The impulse signal integrators 81',82',83' technically are capacitor elements and accumulate the electric voltage impulses generated by the photometric detection unit 70 until the integrator reset switch 86 is closed and all impulse signal integrators 81', 82' 83' are discharged. The impulse signal integrators 81', 82' 83' have a saturation voltage Us of, for example, 2600 mV.

The three A/D-converters 81,82,83 each have a high-precision-converting trigger port H and a low-precision-converting trigger port L. When the low-precision-converting trigger ports L of the three A/D-converters 81, 82, 83 are synchronously triggered, low-precision A/D conversions of the actual voltages of the three corresponding impulse signal integrators 81', 82' 83' are provided which takes only a about 2 ms. The low-precision-conversion takes less time than the charging of the impulse energy capacitor 33.

When the high-precision-converting trigger ports of the three A/D converters 81, 82, 83 are synchronously triggered, very precise and high-precision A/D-conversions of the actual voltages of the three corresponding impulse signal integrators 81', 82', 83' are provided by the corresponding A/D converters 81, 82, 83 which takes about 65 ms. The high-precision-conversion takes much more time than the charging of the impulse energy capacitor 33.

The measuring cycle control 90 comprises a reset port 91 for activating the integrator reset switch 86, comprises a low-precision request port 92 for synchronously requesting a fast low-precision A/D conversion via the low-precision-converting trigger ports L of the A/D converters 81, 82, 83, and comprises a high-precision-request port 93 for synchronously requesting a high-precision A/D conversion via the high-precision-converting trigger ports H of the three A/D converters 81, 82, 83.

The measuring cycle control 90 further comprises an integration target memory 94 memorizing an integration target voltage value Ut and comprises an evaluation module 95 for continuously evaluating the digital A/D-converter results in relation to the integration target voltage value Ut. The integration target voltage value Ut is, in the present embodiment, 2000 mV.

The measuring cycle control 90 comprises a flash counter 99 counting the cycle flashes F generated by the flashlight source 61 within one measurement cycle and comprises a maximum flashing number memory 99' memorizing a maximum flash number Fmax of, in this embodiment, 64 flashes.

The measuring cycle control 90 also comprises a signal ramp pattern table memory 96 and a cycle pattern table memory 98.

The photometer control 80 controls the complete measurement process and adapts the length of a measurement cycle to the intensity level of the light impulses received by the photometric detection unit 70 and accumulated by the impulse signal integrators 81', 82', 83'.

The immersion probe 20 comprises an electronic probe control 50 for controlling the communication between the photometer control 80 of the immersion probe 20 and a control electronics 14 of the land-based control unit 12 via a signal line 51.

When the photometer control 80 starts a new measurement cycle CY, the impulse ignition switch 36 is electronically caused to provide photometric light impulses generated by the photometer flashlight source 61 with a flashing interval of, for example, about 20 ms. After the third single flash, the photometer control 80 requests after every following single flash a low-precision-conversion via the low-precision request port 91 and the connected low-precision-conversion trigger ports L of all A/D-converters 81, 82, 83, and compares the digital low-precision voltage values U provided by the A/D-converters 81, 82, 83 with the memorized integration target voltage value Ut memorized in the integration target memory 94. As long as the highest digital voltage value U of all A/D converters 81, 82, 83 is below the memorized integration target voltage value Ut, the measurement cycle CY is continued by continuing the flashing action.

As soon as the voltage U of the first of all impulse signal integrators 81', 82', 83' has exceeded the memorized integration target voltage value Ut, the flashing action is stopped and the photometer control 80 requests a synchronous high-precision-A/D-conversion via the high-precision request port 93 and the corresponding high-precision-converting trigger ports H of all A/D converters 81, 82, 83 to determine the final digital voltage value of all impulse signal integrators 81', 82', 83'. These final digital voltage values are then converted into corresponding concentration values of nitrite and nitrate in the sample water 17 and into a corresponding device condition value. After the high-precision conversion, the reset port 91 of the measuring cycle control 90 causes the integrator reset switch 86 to reset the impulse signal integrators 81', 82' 83' to be reset to a voltage value of zero, so that the photometer is a ready for the following measurement cycle.

FIGS. 3*a* to 3*d* show measurement cycles CY for different sample water absorptions for that detector element receiving the highest light intensity of all three detector elements 71, 72, 73. The impulse time interval ti is always constant and is about 20 ms. The high-precision conversion time interval tc of a single high-precision conversion interval 100 is always constant and is about 65 ms.

Figure 3A:
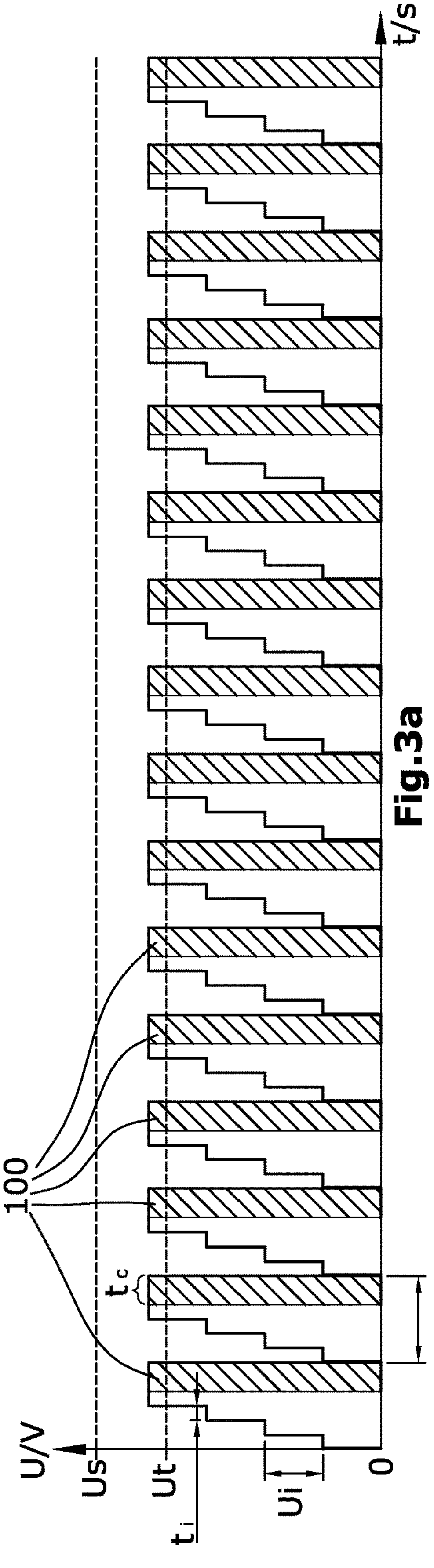

FIG. 3*a* shows, for the detector element receiving the highest light intensity, several identical measurement cycles CY for very clear drinking water causing a very low general light absorption. Every photometric light impulse therefore causes a relatively high impulse voltage Ui at the corresponding impulse signal integrator 81', 82', 83'. After the third flashlight source impulse, the measuring cycle control 90 receives the integrated low-precision digital voltage value U of the corresponding A/D converter 81, 82, 83, compares the integrated low-precision voltage value U with the memorized integration target voltage value Ut, detects a non-exceeding and allows a another photometric light impulse generated by the photometer flashlight source 61. After the fourth flashlight source impulse, the measuring cycle control 90 receives again the integrated low-precision voltage value U of the corresponding A/D converter 81, 82, 83, compares the integrated low-precision voltage value U with the memorized integration target voltage value Ut, and detects that the integrated low-precision voltage value U is now higher than the memorized integration target voltage value Ut. The measuring cycle control 90 now stops the flashing action and causes all A/D converters 81, 82, 83 to provide a high-precision conversion with the maximum precision. After the high-precision conversion has been finalized, the integrator reset switch 86 is closed for synchronously resetting and completely discharging all impulse signal integrators 81', 82', 83' so that a new measurement cycle CY can be started successively.

Figure 3B:
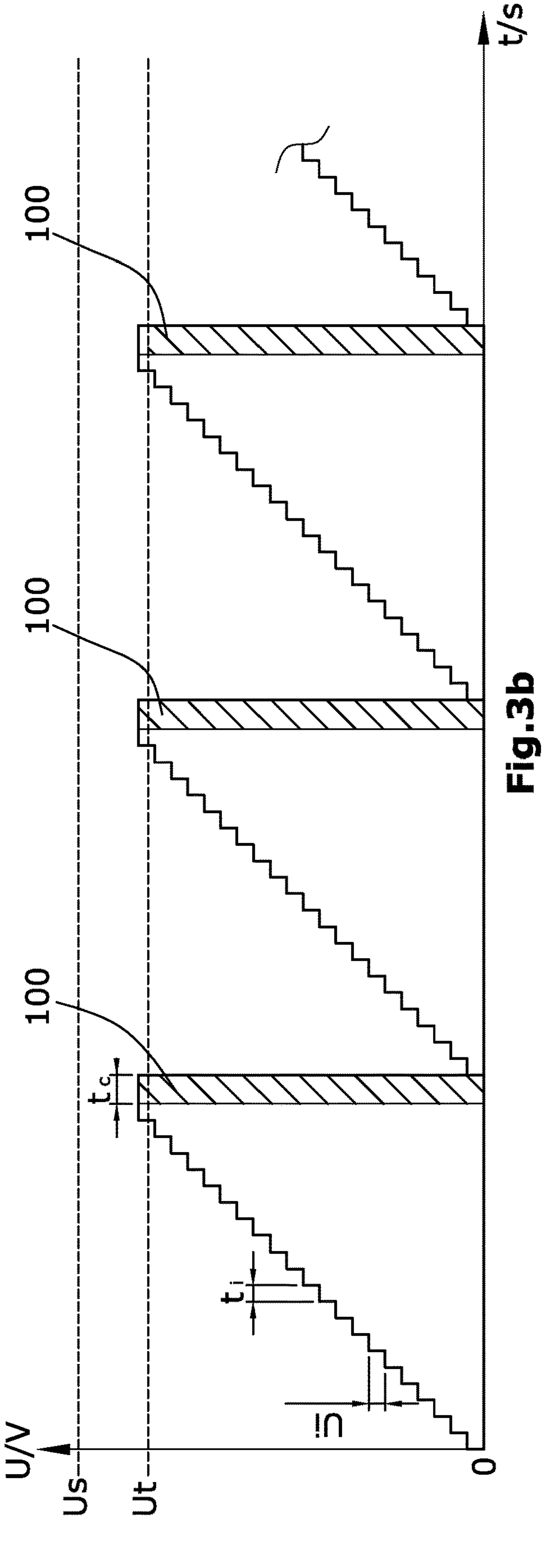
Figure 3C:
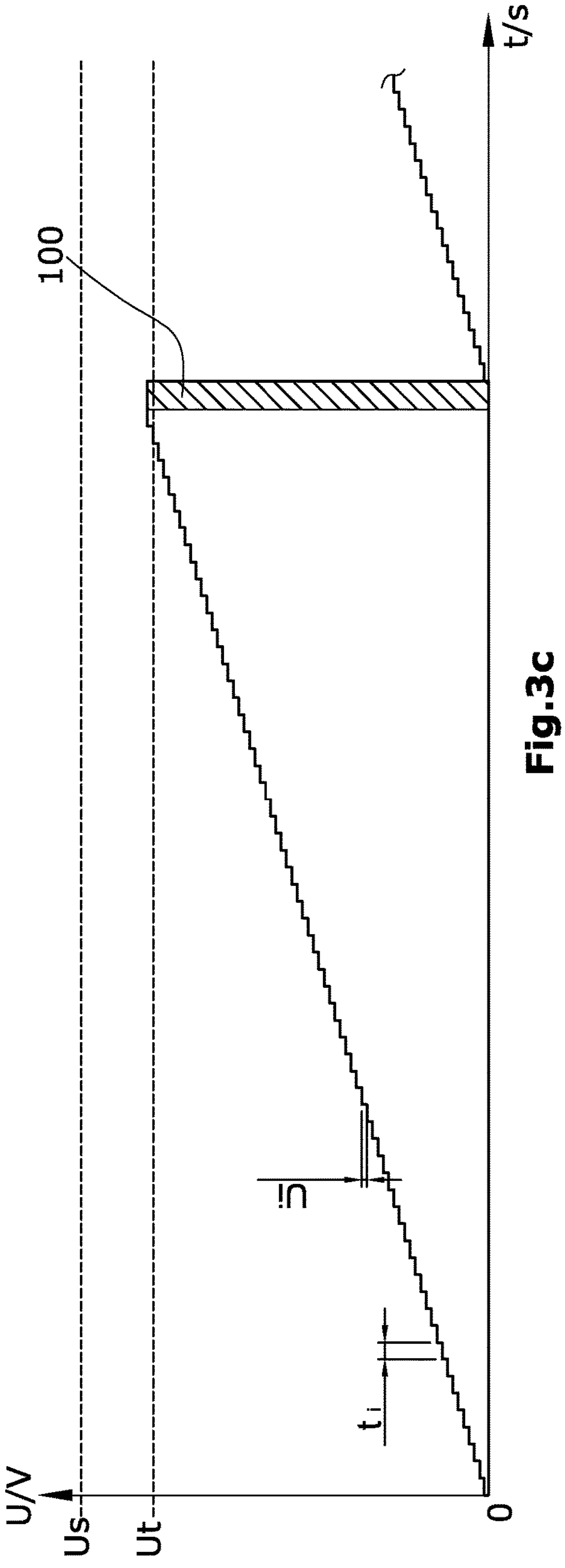

FIGS. 3*b* and 3*c* show measurement cycles CY for more turbid sample water causing less intensive single impulse voltages Ui and causing correspondingly longer measurement cycles CY.

Figure 3D:
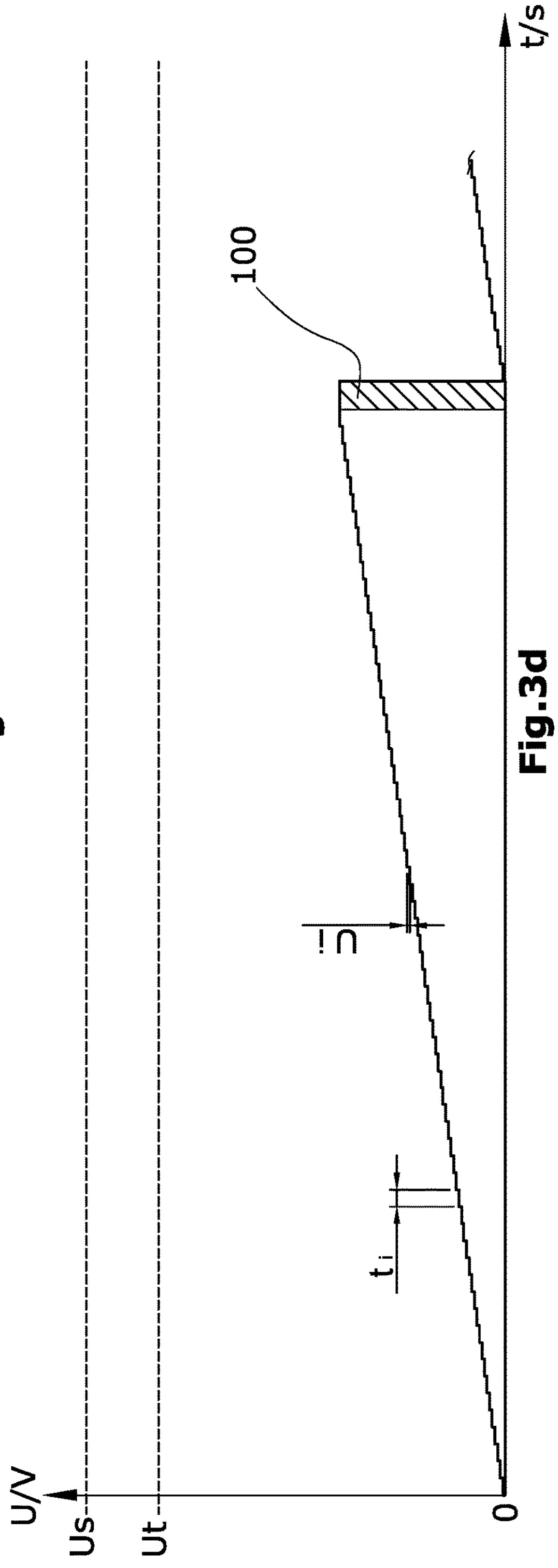

FIG. 3D finally shows a measurement cycle for a very turbid water sample with a very low single impulse voltage Ui. As soon as the flash counter 99 indicates that the number of flashes F within one measurement cycle CY is equal to the maximum flash number Fmax of 64 memorized in the maximum flashing number memory 99', the measurement cycle CY is finished by causing all A/D converters 81, 82, 83 to provide a high-precision converting and to finalize the measurement cycle CY.

Generally, after the first few flashes, the measuring cycle control 90 can provide an estimation of the expected number of photometric light impulses until the first of the impulse signal integrators 81', 82', 83' arrives at the integration target voltage value Ut, so that the measuring cycle control 90 does not need to continuously control the real development of the voltages of the impulse signal integrators 81', 82' 83'.

The invention claimed is:

1. A photometric process measurement arrangement with a photometric immersion probe;

the photometric immersion probe comprising a photometer flashlight source for providing photometric light impulses;

a photometric detector arrangement comprising at least two separate wavelength-selective detection elements; and a photometer control controlling the photometer flashlight source and the detector arrangement;

the photometer control, comprising:

impulse signal integrators for integrating the electric impulses generated by the detection elements;

A/D-converters for converting the voltages of the impulse signal integrators when high-precision-converting trigger ports of the A/D-converters are triggered, wherein a high-precision conversion initiated via the high-precision-converting trigger ports provides greater resolution and takes longer than a low-precision conversion initiated via low-precision-converting trigger ports of the A/D-converters; and a measuring cycle control with an integration target memory memorizing an integration target voltage value;

wherein the photometer control is provided with a high-precision-request port for synchronously triggering the high-precision-converting trigger ports of all A/D-converters after the voltage of the first of all impulse signal integrators has exceeded the memorized integration target voltage value.

2. The photometric process measurement arrangement of claim 1, wherein the A/D converters are provided with low-precision-conversion trigger ports, respectively, which are synchronously triggered by a corresponding low-precision request port of the photometer control, if the voltages of all impulse signal integrators are below the memorized integration target value.

3. The photometric process measurement arrangement of claim 1, wherein the photometer control is provided with a flash counter counting the number of flashes of a measurement cycle and with a maximum flash number memory memorizing a maximum flash number of a measurement cycle, and wherein the photometer control is configured to trigger the high-precision-converting trigger ports of all A/D-converters when the number of flashes counted by the flash counter equals or exceeds the memorized maximum flash number as a safety fallback in the event that the voltage of the first impulse signal integrator does not exceed the memorized integration target voltage value within the maximum flash number.

4. The photometric process measurement arrangement of claim 1, wherein the photometer control is provided with an integrator reset switch for synchronously resetting all impulse signal integrators before a new measurement cycle starts.

5. The photometric process measurement arrangement of claim 1, wherein the integration target voltage value is at least 20% below the saturation voltage of the impulse signal integrators.

6. A photometric measurement method provided by the photometric process measurement arrangement of claim 1, with the following measurement cycle method steps controlled by the photometer control:

generating light impulses with the photometer flashlight source;

monitoring all impulse signal integrators of the wavelength-selective detection elements;

when the voltage of the first of all impulse signal integrators has exceeded a memorized integration target voltage value;

synchronously triggering the high-precision-converting trigger ports of all A/D-converters to determine the final voltages of all impulse signal integrators;

resetting all impulse signal integrators; and starting a new measurement cycle.

7. The photometric measurement method of claim 6, wherein the monitoring step is provided by the photometer control by triggering the low-precision-converting trigger ports of all A/D converters.

8. The photometric measurement method of claim 7, wherein the photometer control estimates the total number of flashes of the full measurement cycle before the fourth flash of the measurement cycle.

9. The photometric measurement method of claim 6, wherein the photometer control triggers the high-precision-converting trigger ports of all A/D-converters and starts a new measurement cycle when the number of flashes of a measurement cycle is equal to the maximum flash number as a safety fallback in the event that the voltage of the first impulse signal integrator does not exceed the memorized integration target voltage value within the maximum flash number.

* * * * *